(12) United States Patent
Jo et al.

(10) Patent No.: US 11,936,266 B2
(45) Date of Patent: Mar. 19, 2024

(54) MOTOR HAVING STATOR WITH GUIDE AND HOLDER

(71) Applicant: LG INNOTEK CO., LTD., Seoul (KR)

(72) Inventors: Jung Woo Jo, Seoul (KR); Moon Jae Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 465 days.

(21) Appl. No.: 17/274,979

(22) PCT Filed: Sep. 11, 2019

(86) PCT No.: PCT/KR2019/011776
§ 371 (c)(1),
(2) Date: Mar. 10, 2021

(87) PCT Pub. No.: WO2020/055132
PCT Pub. Date: Mar. 19, 2020

(65) Prior Publication Data
US 2022/0037948 A1    Feb. 3, 2022

(30) Foreign Application Priority Data
Sep. 11, 2018 (KR) .................. 10-2018-0108448
Dec. 3, 2018 (KR) .................. 10-2018-0153857

(51) Int. Cl.
H02K 3/52 (2006.01)

(52) U.S. Cl.
CPC ......... *H02K 3/522* (2013.01); *H02K 2203/12* (2013.01)

(58) Field of Classification Search
CPC . H02K 3/522; H02K 2203/12; H02K 2203/06
See application file for complete search history.

(56) References Cited

U.S. PATENT DOCUMENTS

| 7,732,968 B2 * | 6/2010 | Zimmer | H02K 3/522 |
| | | | 310/194 |
| 2004/0051417 A1 * | 3/2004 | Yamazaki | H02K 1/148 |
| | | | 310/216.009 |

(Continued)

FOREIGN PATENT DOCUMENTS

| DE | 10 2006 021 903 A1 | 11/2007 |
| DE | 10 2014 205 827 A1 | 10/2015 |

(Continued)

OTHER PUBLICATIONS

DE-102014205827-A1_translated (Year: 2015).*

*Primary Examiner* — Tulsidas C Patel
*Assistant Examiner* — Mohammed Ahmed Qureshi
(74) *Attorney, Agent, or Firm* — Birch, Stewart, Kolasch & Birch, LLP

(57) ABSTRACT

The present invention may provide a motor including a housing, a stator disposed in the housing, a rotor disposed inside the stator, and a shaft coupled to the rotor, wherein the stator includes a stator core, a first insulator disposed on the stator core, and a coil disposed on the first insulator, the first insulator includes a body on which the coil is disposed, a guide extending from one side of the body and including an opening, and a holder extending from one portion of the guide and including a groove, and one portion of the coil is disposed in the opening of the guide and the groove of the holder.

10 Claims, 22 Drawing Sheets

(56) References Cited

U.S. PATENT DOCUMENTS

| | | | |
|---|---|---|---|
| 2011/0133581 A1* | 6/2011 | Ha | H02K 3/522 310/71 |
| 2014/0084740 A1 | 3/2014 | Carpenter et al. | |
| 2015/0054377 A1 | 2/2015 | Kameyama et al. | |
| 2018/0375398 A1 | 12/2018 | Lee | |

FOREIGN PATENT DOCUMENTS

| | | | |
|---|---|---|---|
| DE | 102014205827 A1 * | 10/2015 | H01F 27/28 |
| JP | 2010-110048 A | 5/2010 | |
| JP | 2010-200486 A | 9/2010 | |
| JP | 2011-135640 A | 7/2011 | |
| JP | 2011-234518 A | 11/2011 | |
| JP | 2012-253979 A | 12/2012 | |
| JP | 5627819 B2 | 11/2014 | |
| JP | 2016-72997 A | 5/2016 | |
| KR | 10-2015-0090791 A | 8/2015 | |
| KR | 10-2017-0071309 A | 6/2017 | |

* cited by examiner

[FIG. 1]
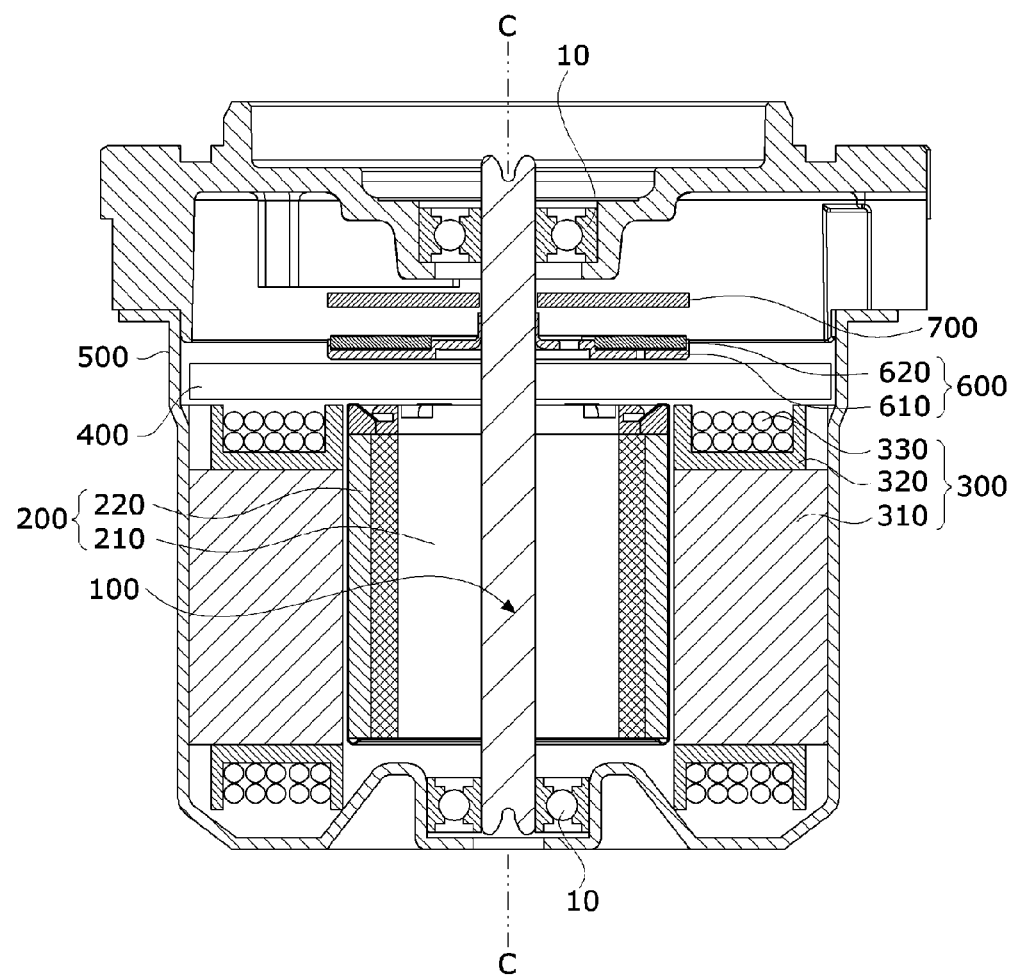

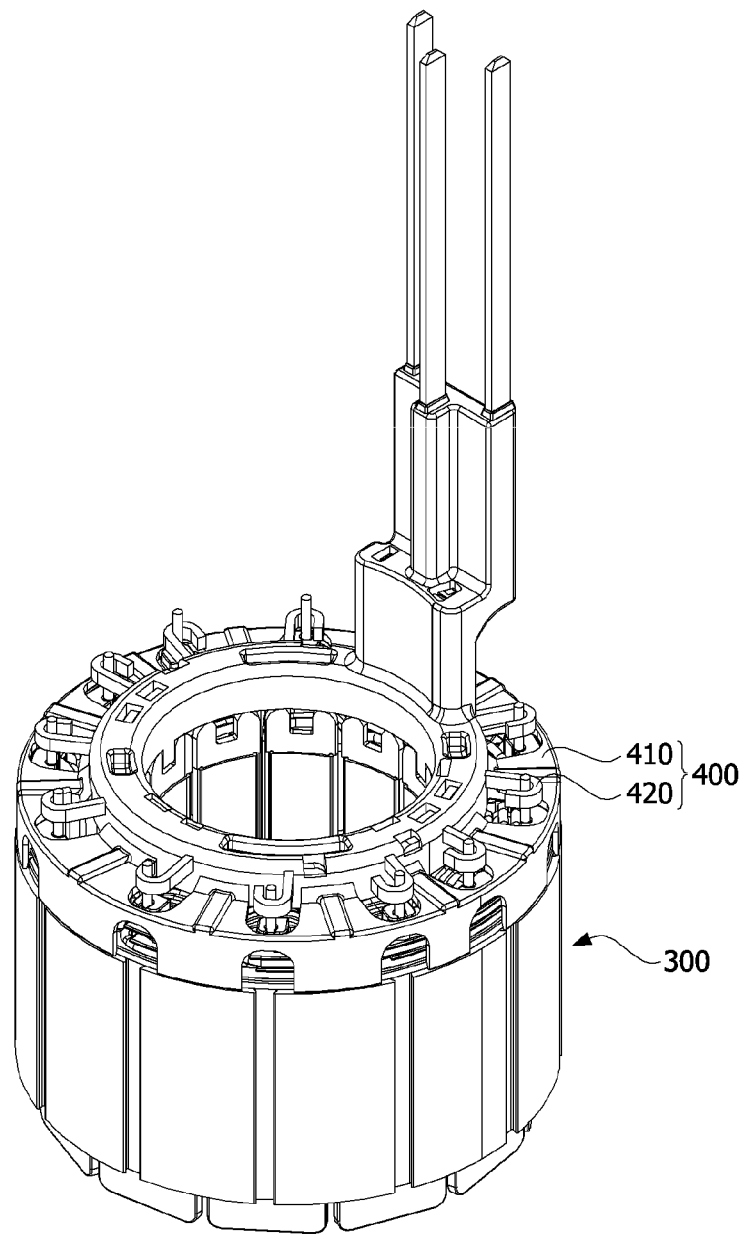
[FIG. 2]

[FIG. 3]
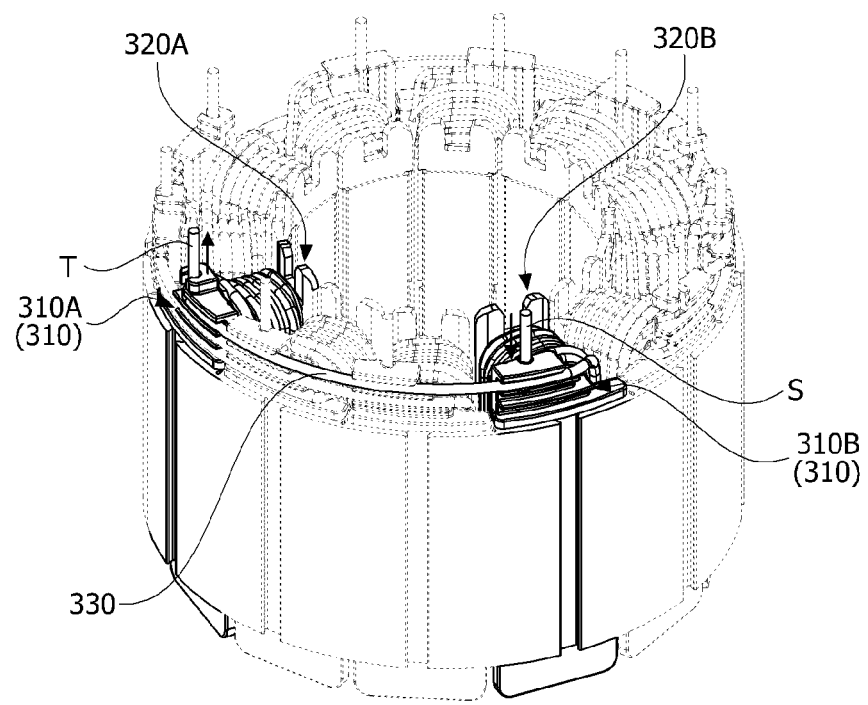

[FIG. 4]
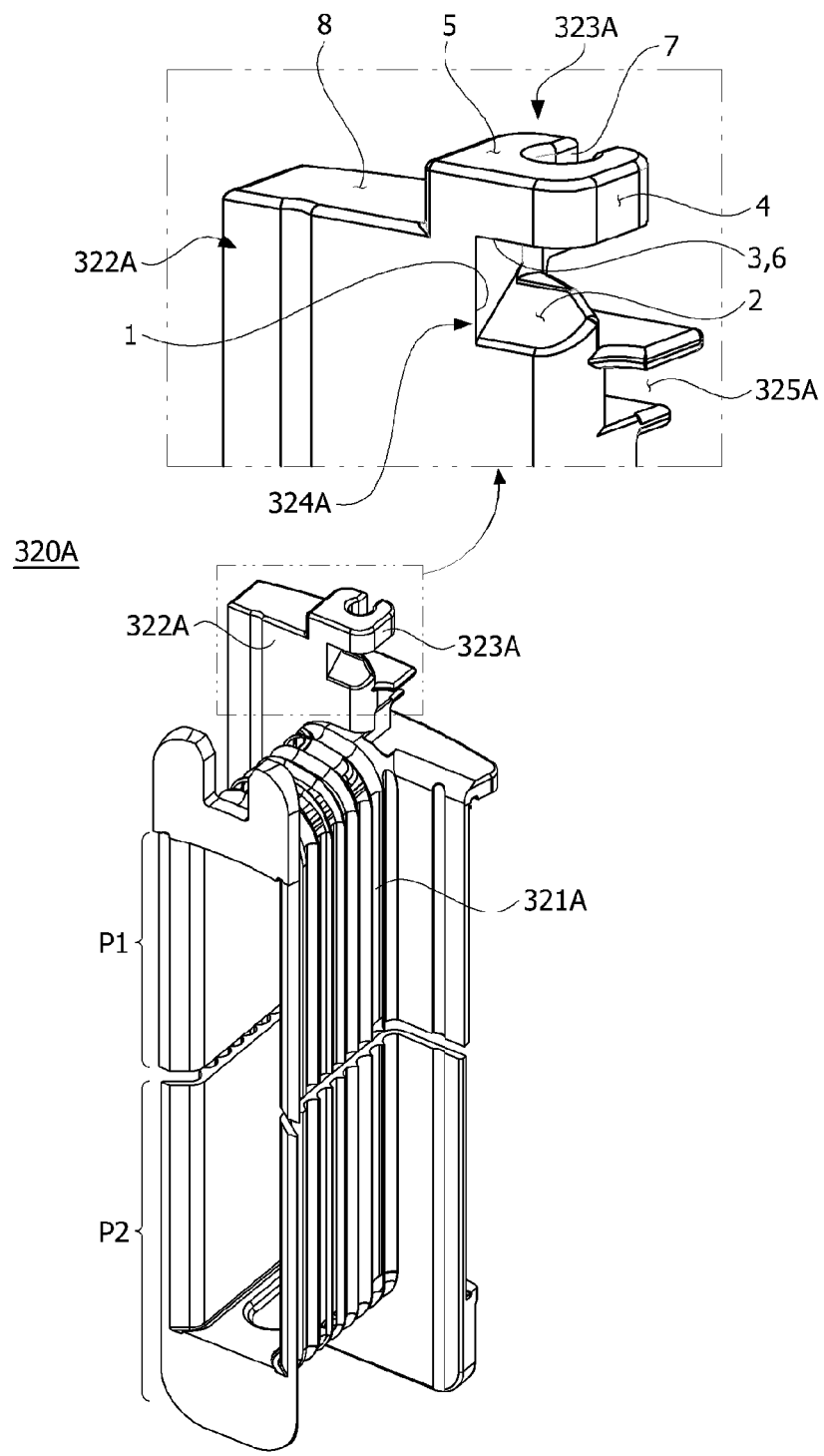

[FIG. 5]
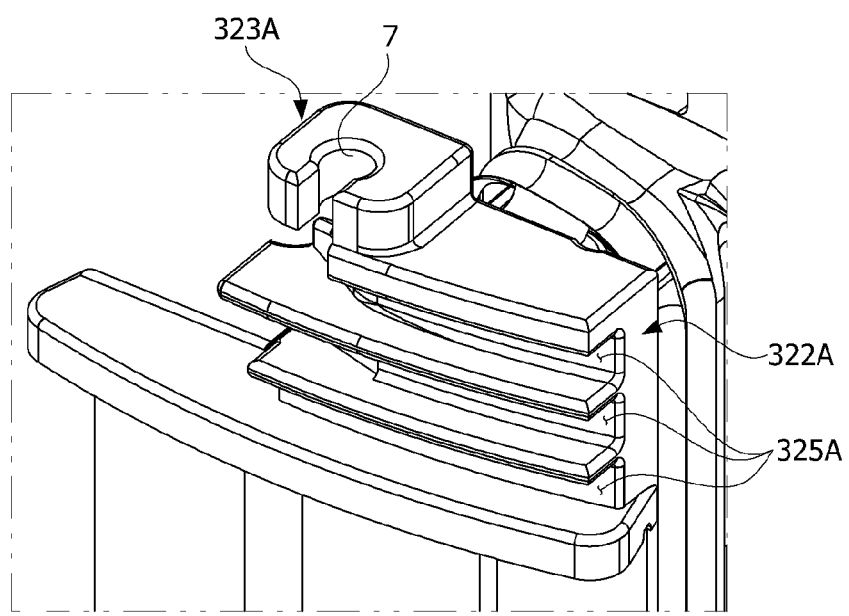

[FIG. 6]
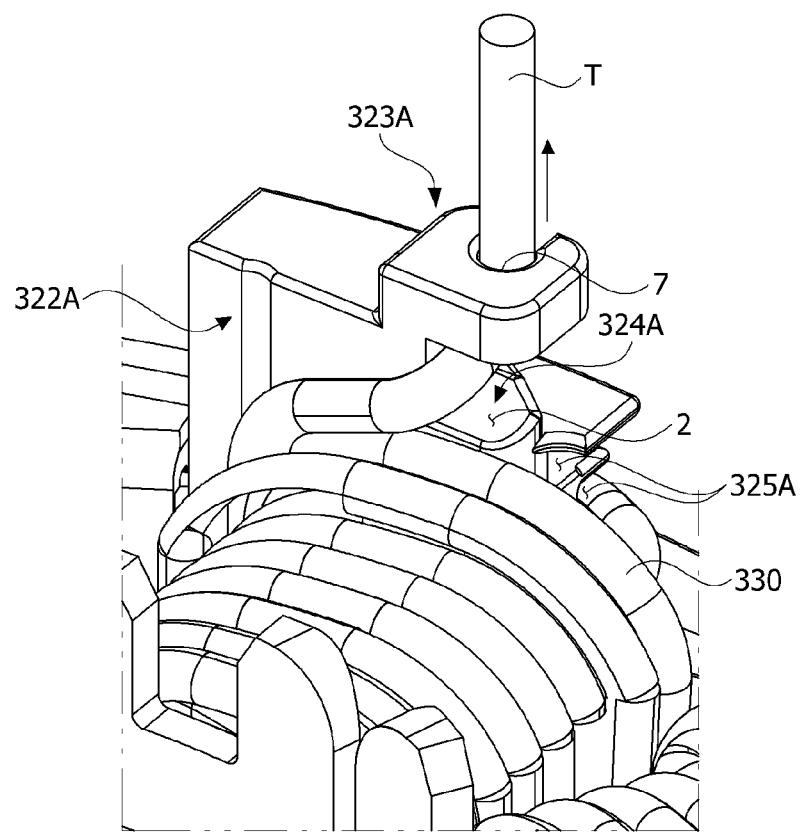

[FIG. 7]
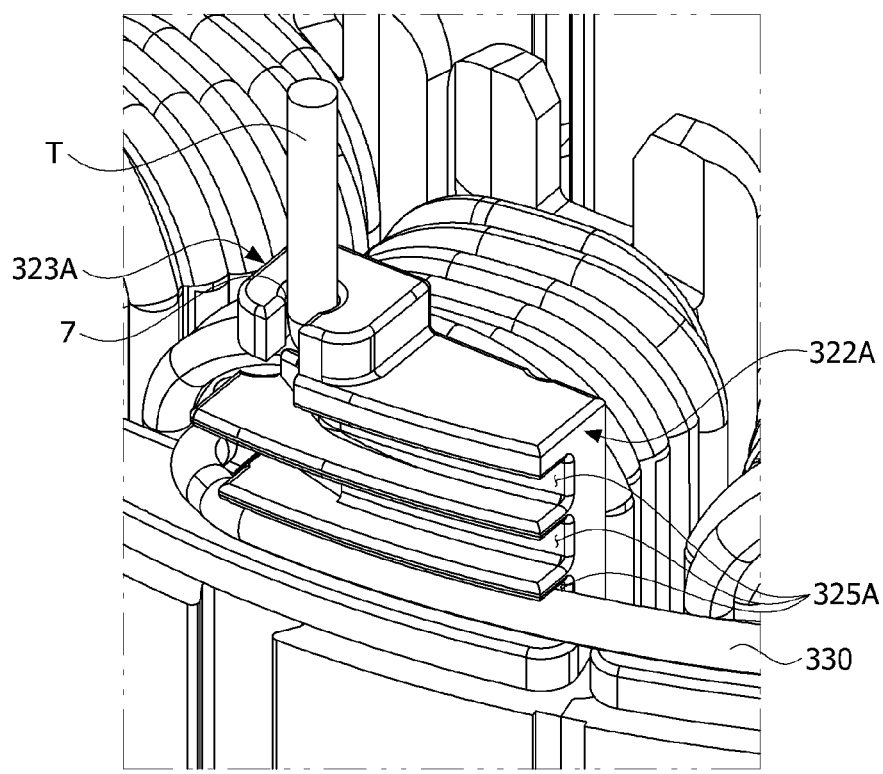

[FIG. 8]
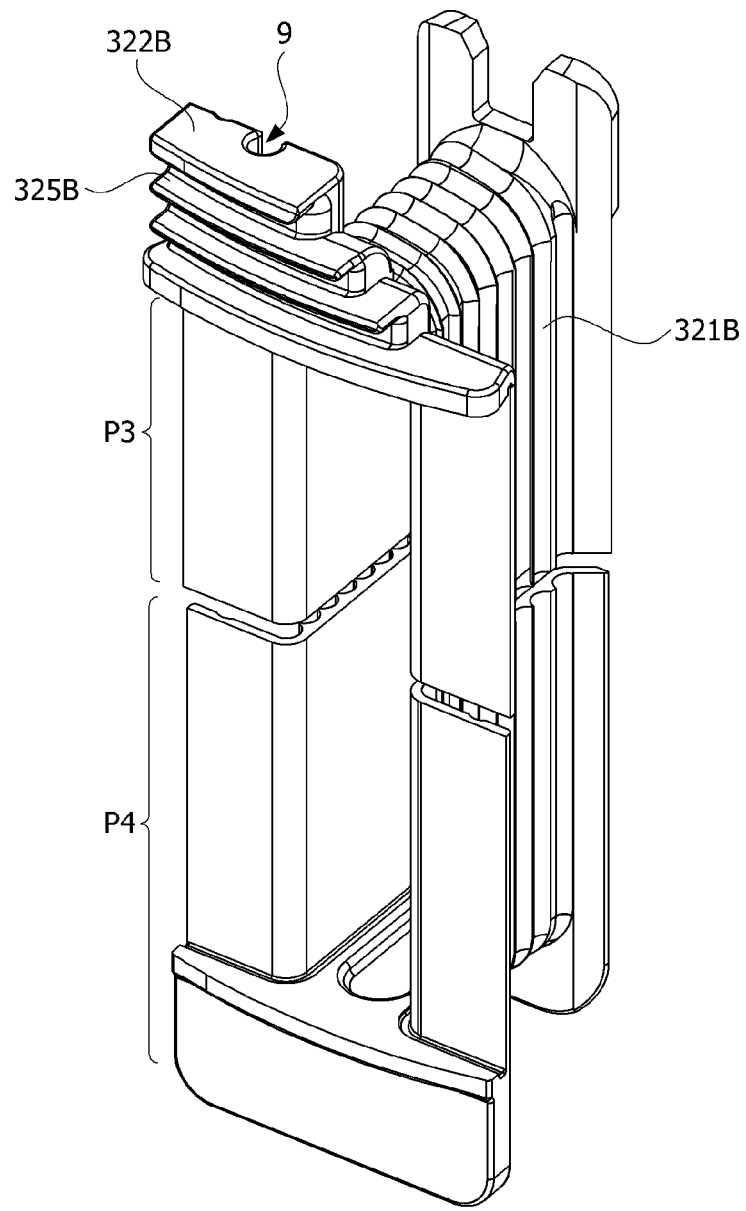

[FIG. 9]
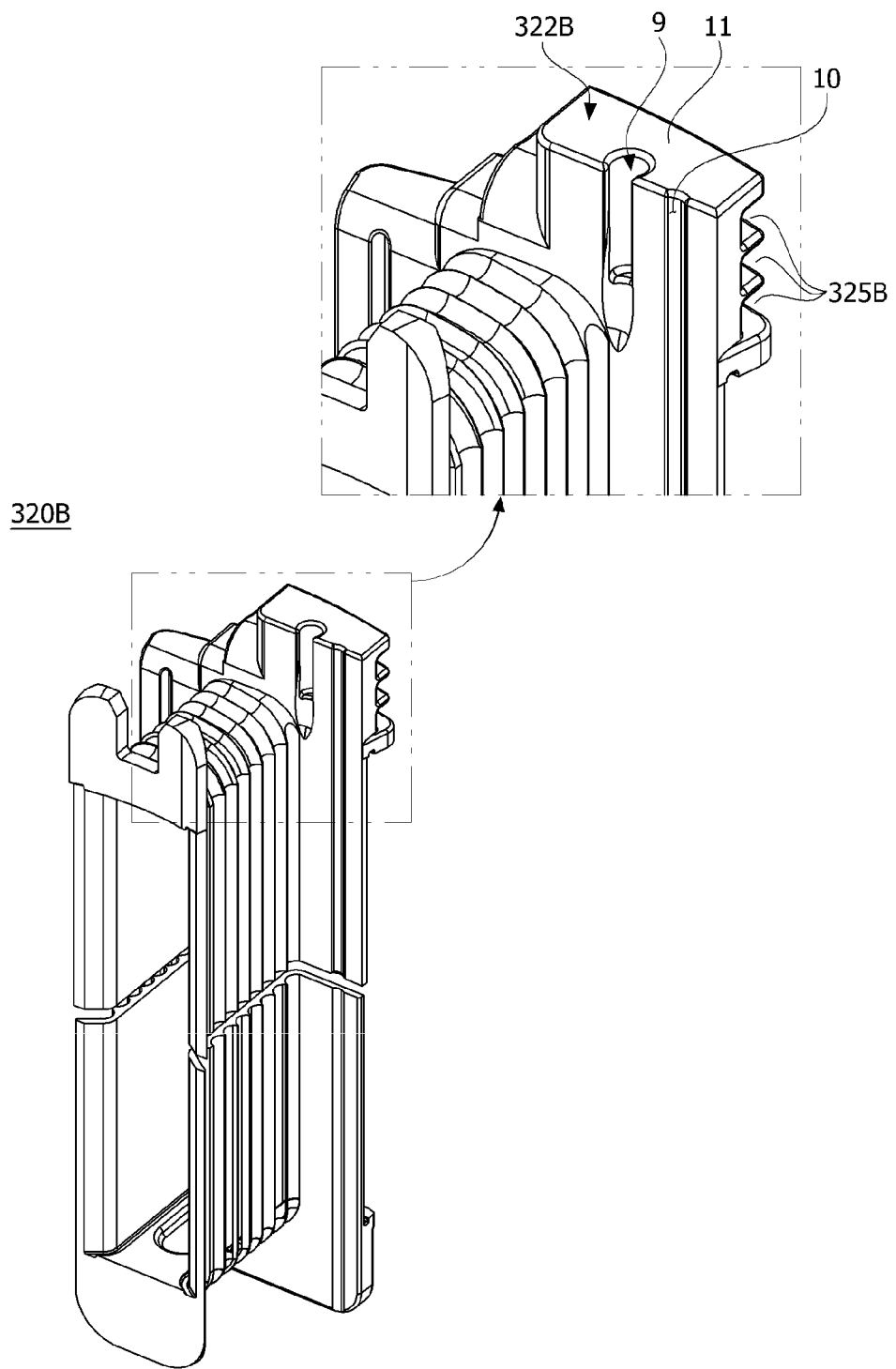

[FIG. 10]
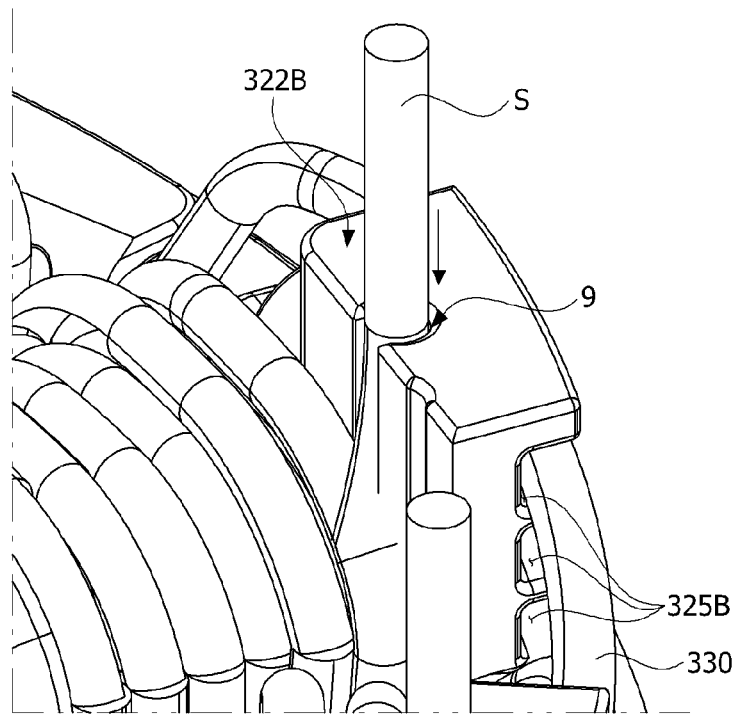

[FIG. 11]
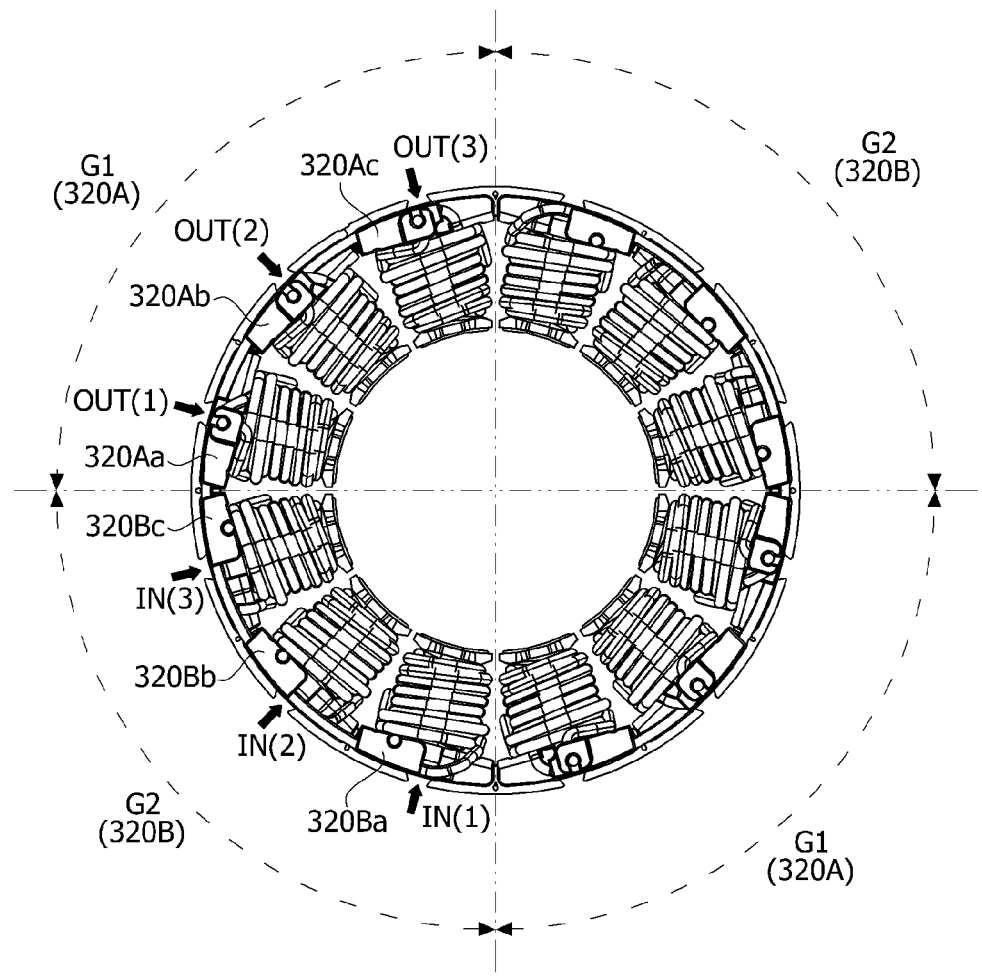

[FIG. 12]
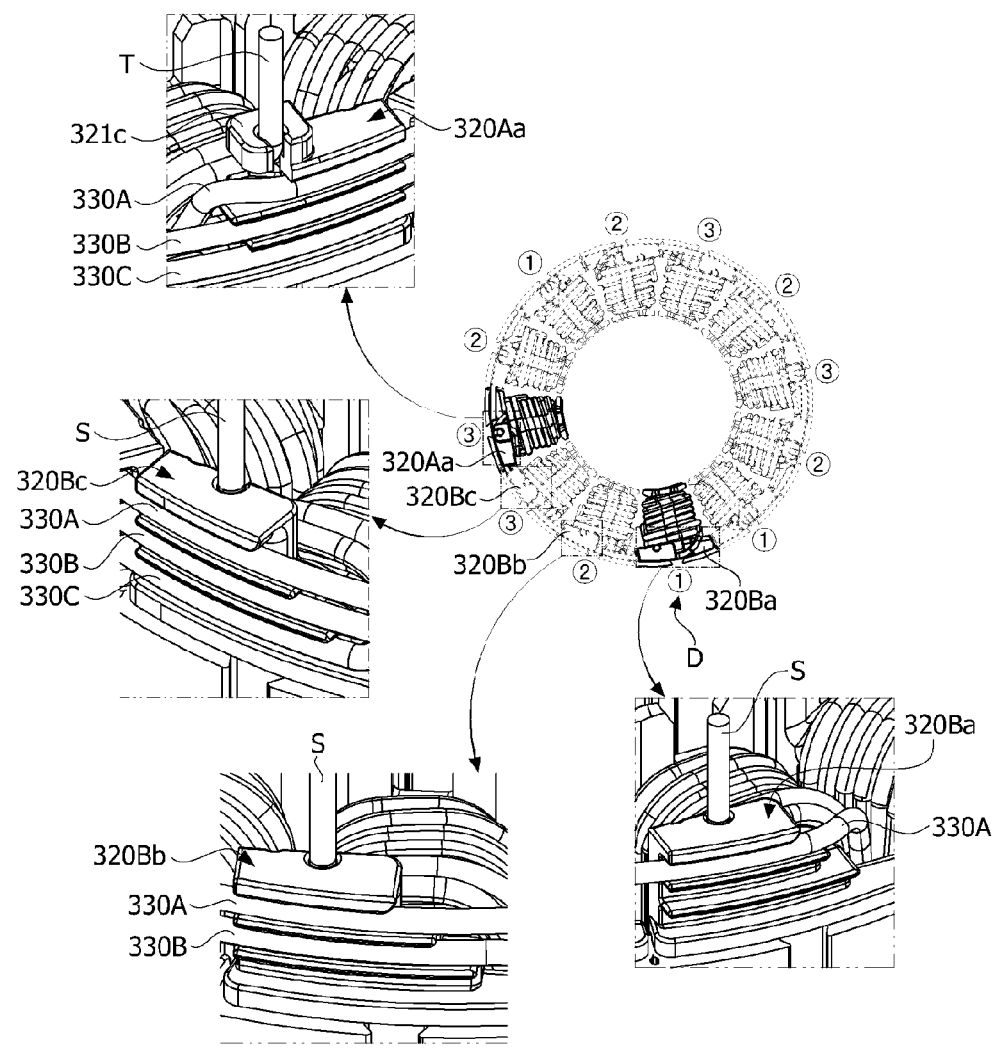

[FIG. 13]
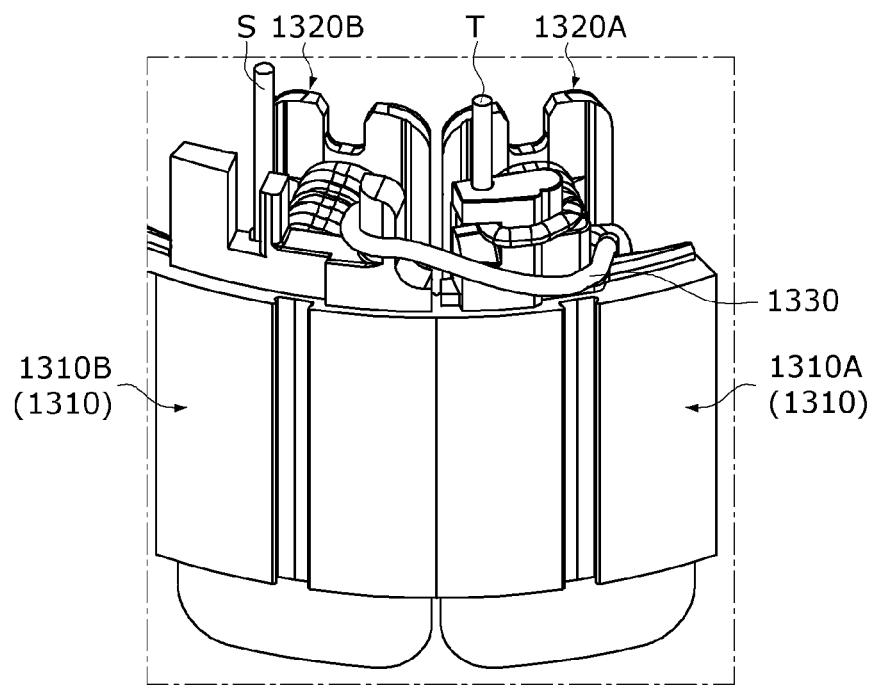

[FIG. 14]
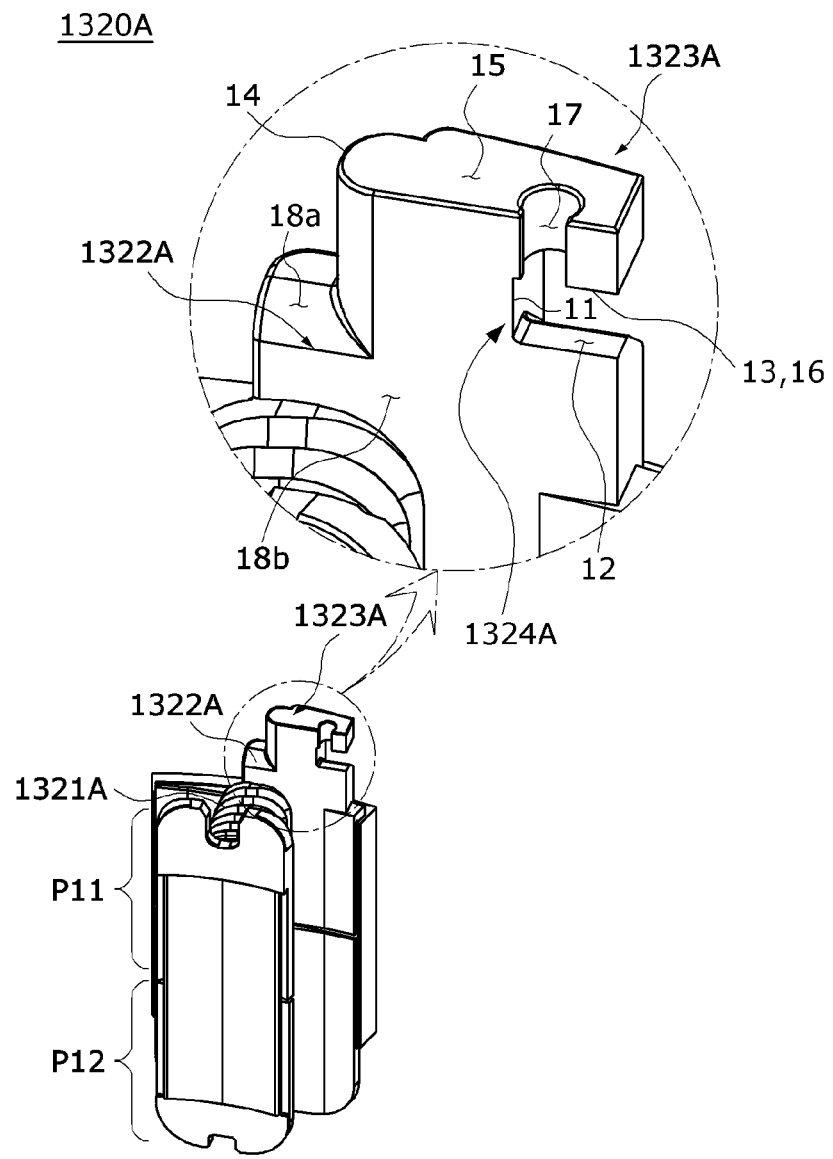

[FIG. 15]
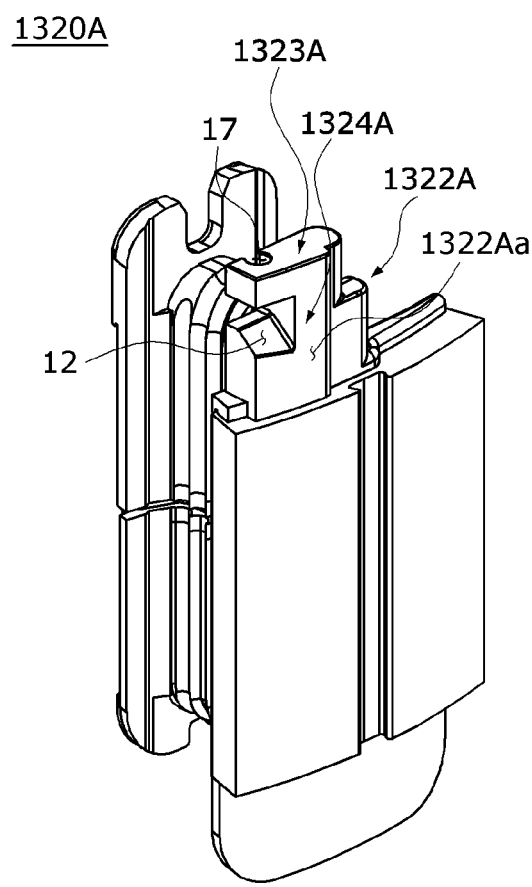

[FIG. 16]
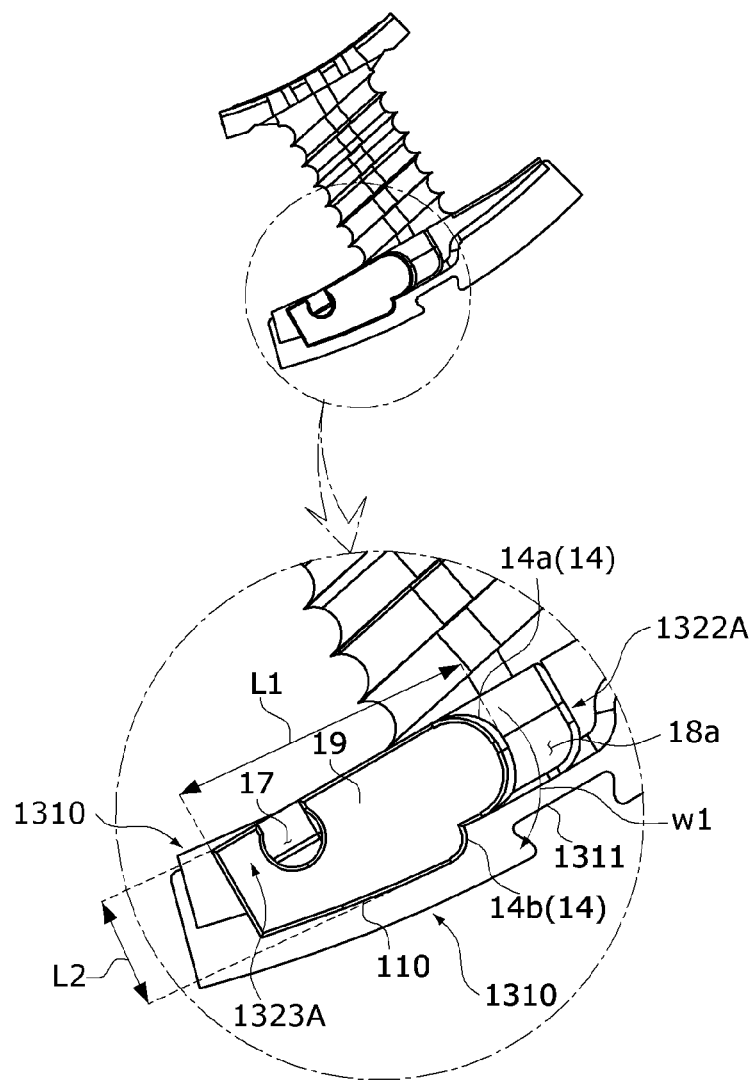

[FIG. 17]
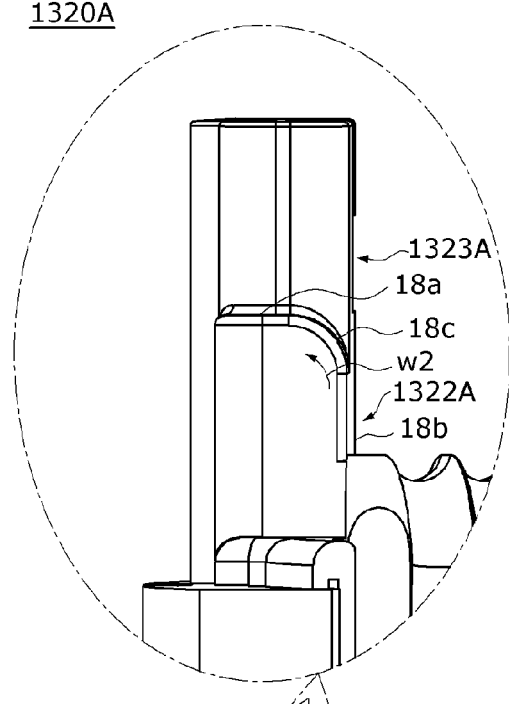
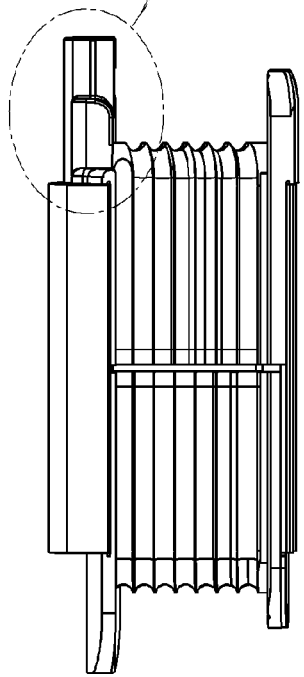

[FIG. 18]
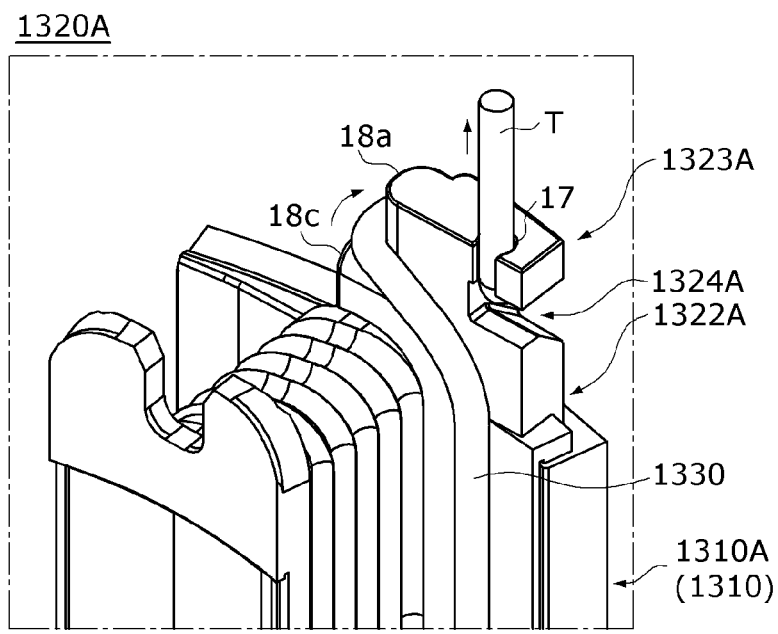

[FIG. 19]
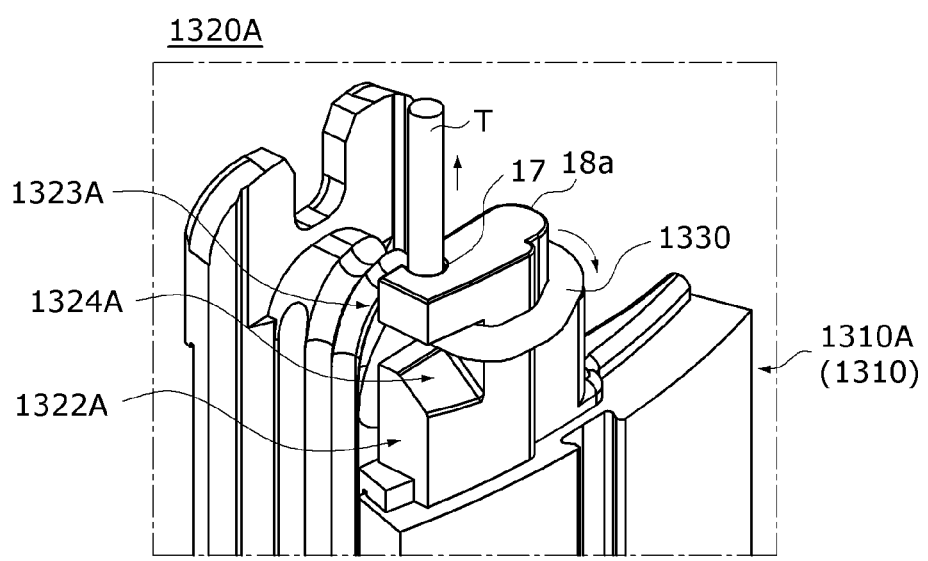

[FIG. 20]
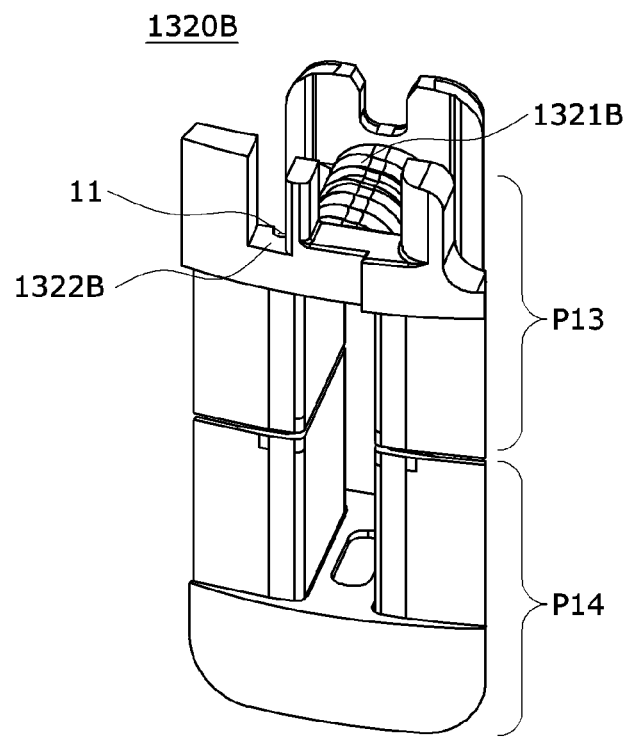

[FIG. 21]
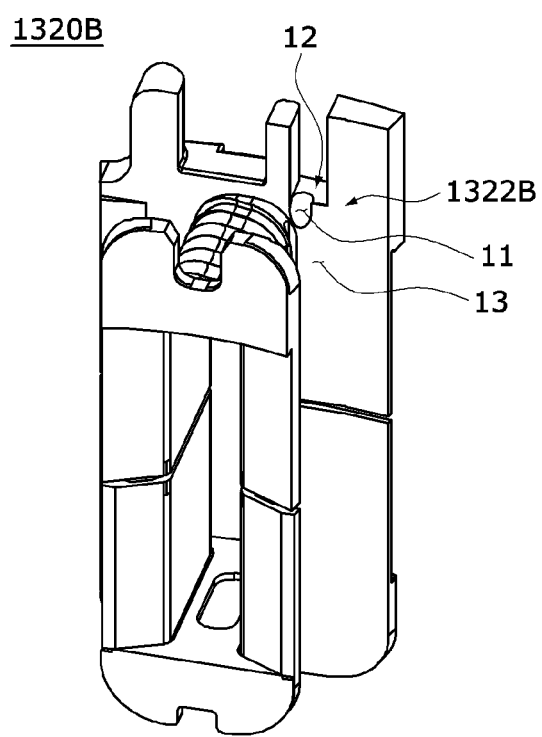

[FIG. 22]
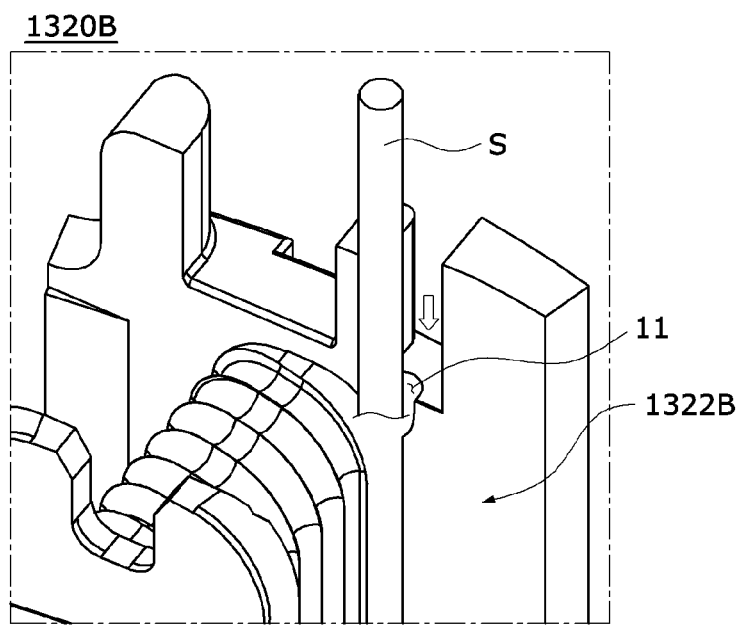

US 11,936,266 B2

MOTOR HAVING STATOR WITH GUIDE AND HOLDER

CROSS REFERENCE TO RELATED APPLICATIONS

This application is the National Phase of PCT International Application No. PCT/KR2019/011776, filed on Sep. 11, 2019, which claims priority under 35 U.S.C. 119(a) to Patent Application Nos. 10-2018-0108448, filed in the Republic of Korea on Sep. 11, 2018 and 10-2018-0153857, filed in the Republic of Korea on Dec. 3, 2018, all of which are hereby expressly incorporated by reference into the present application.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, an electronic power steering (EPS) system in which the motor is used secures turning stability and provides a rapid restoring force by driving the motor according to traveling conditions using an electronic control unit (ECU). Accordingly, a driver can travel safely.

A motor includes a shaft, a rotor, and a stator. The stator includes a plurality of teeth. Insulators are provided on the teeth for insulation. Coils are wound around the insulators. After winding, positions of starting ends and finishing ends are arranged for fusing. However, in the case of the finishing ends, there is a problem in that the positions are not uniform due to a winding process or tension of the coil. This problem becomes an obstacle to automation in manufacturing the motor and a cause of fusing quality degradation.

Technical Problem

The present invention is directed to providing a motor in which finishing ends of coils are arranged.

Technical Solution

One aspect of the present invention provides a motor including a housing, a stator disposed in the housing, a rotor disposed inside the stator, and a shaft coupled to the rotor, wherein the stator includes a stator core, a first insulator disposed on the stator core, and a coil disposed on the first insulator, the first insulator includes a body on which the coil is disposed, a guide extending from one side of the body and including an opening, and a holder extending from one portion of the guide and including a groove, and one portion of the coil is disposed in the opening of the guide and the groove of the holder.

The guide of the first insulator may extend upward from an outer side of the body with respect to the shaft, and the holder of the first insulator may overlap the opening of the guide in a rotating shaft direction and extend from an upper side of the guide.

The groove of the holder may be disposed above the opening of the guide.

The motor may further include an upper surface, a lower surface, and a side surface which define the opening of the guide, wherein the lower surface of the opening may include an inclined surface.

The holder may include a side surface and an upper surface, wherein a step may be formed between the side surface and an upper surface of the guide, and the groove of the holder may be formed from a lower surface to the upper surface of the holder.

An upper surface of the opening may be the lower surface of the holder, and one side surface of the opening may be open.

The stator may further include a second insulator disposed on the stator core, wherein the second insulator may include a body around which the coil is wound and a guide extending from one side of the body, and a side surface of the guide of each of the first insulator and the second insulator may include a plurality of slots.

One portion of the coil may be disposed in the slot.

The stator may include a plurality of first insulators identical to the first insulator and a plurality of second insulators identical to the second insulator, and at least one of the second insulators may be disposed between two first insulators among the plurality of first insulators.

The coil may be disposed in the slot and on the body of the first insulator.

The opening of the guide may be positioned above the slot at an uppermost side of the plurality of slots.

Another aspect of the present invention provides a motor including a stator, and a rotor disposed inside the stator, wherein the stator includes a stator core, a first insulator and a second insulator which are coupled to the stator core, and a coil disposed on the first insulator and the second insulator, the first insulator includes a body, a guide extending from one side of the body, and a holder extending from the guide and including a groove, the coil includes a first coil and a second coil, and the first coil is disposed on an outer side surface of the guide, on the body, and in the groove of the holder of the first insulator.

The first coil and the second coil may be disposed on an outer side surface of at least one of the first insulator and the second insulator.

The guide of the first insulator may include an opening, and the first coil may pass through the opening and may be disposed in the groove of the holder.

The coil may include a third coil, the first coil, the second coil, and the third coil may have different phases, three first insulators and three second insulators may be provided, and the first coil, the second coil, and the third coil may be disposed on an outer side surface of at least one of the plurality of first insulators and second insulators.

One portion of each of the first coil, the second coil, and the third coil may be disposed in the groove of the holder of each of the three first insulators.

The three first insulators may be continuously disposed in a circumferential direction, the first coil, the second coil, and the third coil may be disposed on an outer side surface of one of the three first insulators to overlap in a shaft direction, the first coil and the second coil may be disposed on an outer side surface of another of the three first insulators to overlap in the shaft direction, and Only the first coil may be disposed on an outer side surface of the remaining one of the three first insulators.

The three second insulator may be continuously disposed in the circumferential direction, the first coil, the second coil, and the third coil may be disposed on an outer side surface of one of the three second insulators to overlap in the shaft direction, the first coil and the second coil may be disposed on an outer side surface of another of the three second insulators to overlap in the shaft direction, and Only the first coil may be disposed on an outer side surface of the remaining one of the three second insulators.

Still another aspect of the present invention provides a motor including a housing, a stator disposed in the housing, a rotor disposed inside the stator, and a shaft coupled to the rotor, wherein the stator includes a stator core, a first insulator disposed on the stator core, and a coil disposed on the first insulator, the first insulator includes a body on which the coil is disposed, a guide extending from one side of the body, and a holder extending from one portion of the guide and including an opening and a groove, the holder includes a side surface and an upper surface, wherein a step may be formed between the side surface and an upper surface of the guide, and one portion of the coil is in contact with the side surface and is disposed in an opening of the guide and the groove of the holder.

Yet another aspect of the present invention provides a motor including a housing, a stator disposed in the housing, a rotor disposed inside the stator, and a shaft coupled to the rotor, wherein the stator includes a stator core, a first insulator and a second insulator which are coupled to the stator core, and a coil disposed on the first insulator and the second insulator, a starting end of the coil is disposed on the second insulator, a finishing end of the coil is disposed on the first insulator, the first insulator includes a body, a guide extending from one side of the body, and a holder extending from the guide and including an opening and a groove, the holder includes a side surface and an upper surface, wherein a step may be formed between the side surface and an upper surface of the guide, one portion of the coil is in contact with the side surface and passes through an opening of the guide, and the finishing end is disposed in the groove of the holder.

The holder may include an inner surface and an outer surface, and the side surface may include a curved surface which continues from the inner surface to the outer surface.

The guide may include an inner surface and a boundary surface which is a boundary between the inner surface of the guide and the upper surface, and the boundary surface of the guide may be a curved surface.

The guide of the first insulator may extend upward from an outer side of the body with respect to the shaft, and the holder may overlap the opening in a rotating shaft direction and extend from an upper side of the guide.

The groove of the holder may be disposed above the opening.

The holder may include an upper surface, a lower surface, and a side surface which define the opening, and a lower surface of the opening may be obliquely disposed.

The groove of the holder may be formed from the lower surface to the upper surface of the holder.

One side surface of the opening may be open.

The first insulator and the second insulator may be alternately disposed in a circumferential direction of the stator.

Advantageous Effects

According to embodiments, since finishing ends of coils are arranged, there is an advantage of manufacturing automation, and an advantageous effect of improving fusing quality of the coil is provided.

An advantageous effect of securing stiffness of a holder supporting one portion of the coil is provided.

DESCRIPTION OF DRAWINGS

FIG. 1 is a view illustrating a motor according to a first embodiment.

FIG. 2 is a view illustrating a stator and a busbar.

FIG. 3 is a view illustrating the stator.

FIG. 4 is a view illustrating a first insulator.

FIG. 5 is a view illustrating a slot of the first insulator.

FIG. 6 is a view illustrating the first insulator around which a coil is wound.

FIG. 7 is a view illustrating the slot, in which the coil is disposed, of the first insulator.

FIG. 8 is a view illustrating a second insulator.

FIG. 9 is a view illustrating a groove of the second insulator.

FIG. 10 is a view illustrating the second insulator around which the coil is wound.

FIG. 11 is a plan view illustrating the stator.

FIG. 12 is a view illustrating a first coil, a second coil, and a third coil.

FIG. 13 is a view illustrating a stator of a motor according to a second embodiment.

FIG. 14 is a view illustrating a first insulator when viewed from the inside.

FIG. 15 is a view illustrating the first insulator when viewed from the outside.

FIG. 16 is a plan view illustrating a holder of the first insulator.

FIG. 17 is a side view illustrating the first insulator.

FIG. 18 is a view illustrating the first insulator around which a coil is wound when viewed from the inside.

FIG. 19 is a view illustrating the first insulator around which the coil is wound when viewed from the outside.

FIG. 20 is a view illustrating a second insulator.

FIG. 21 is a view illustrating a groove of the second insulator.

FIG. 22 is a view illustrating the second insulator around which the coil is wound.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

FIG. 1 is a view illustrating a motor according to a first embodiment.

Referring to FIG. 1, the motor according to the embodiment may include a rotating shaft 100, a rotor 200, a stator 300, a busbar 400, a housing 500, a sensing part 600, and a substrate 700. Hereinafter, the term "inside" is referred to as a direction from the housing 500 to the rotating shaft 100 which is a center of the motor, and the term "outside" is referred to as a direction opposite to "inside", which is a direction from the rotating shaft 100 to the housing 500. In addition, hereinafter, a circumferential direction or a radial direction is based on a shaft center.

The rotating shaft 100 may be coupled to the rotor 200. When a current is supplied, an electrical interaction occurs between the rotor 200 and the stator 300, the rotor 200 is rotated, and the rotating shaft 100 is rotated in conjunction with the rotation of the rotor 200. The rotating shaft 100 is rotatably supported by bearings 10. The rotating shaft 100 may be connected to a steering apparatus of a vehicle to transmit power to the steering apparatus.

The rotor 200 is rotated due to the electrical interaction with the stator 300. The rotor 200 may be disposed inside the stator 300. The rotor 200 may include a rotor core 210 and magnets 220 disposed on the rotor core 210. In this case, the rotor 200 may be a surface permanent magnet (SPM) type rotor in which the magnets 220 are disposed on an outer circumferential surface of the rotor core 210 or an interior permanent magnet (IMP) type rotor in which the magnets 220 are disposed inside the rotor core 210. The rotor core 210 may be formed in a form in which a plurality of pucks (unit cores) forming skew angles are stacked on each other.

The stator 300 is disposed outside the rotor 200. The stator 300 may include a stator core 310, insulators 320 disposed on the stator core 310, and coils 330. The coils 330 may be wound around the insulators 320. The insulators 320 are disposed between the coils 330 and the stator core 310 to serve to electrically insulate the stator core 310 from the coils 330. The coils 330 induce an electrical interaction with the magnets of the rotor 200.

The rotor 200 and the stator 300 are accommodated in the housing 500.

The busbar 400 is disposed above the stator 300. The busbar 400 includes a body 410 (see FIG. 2) formed of an insulation material and a plurality of terminals 420 (see FIG. 2) coupled to the body 410. In this case, the body 410 is formed of the insulation material to prevent the plurality of terminals 420 from being connected to and in contact with each other. In addition, the plurality of terminals 420 serve to connect the coils 330 wound around the stator core 310 to supply current to the coils 330.

The sensing part 600 may be connected to the rotating shaft 100. The sensing part 600 includes a sensing plate 610 and a sensing magnet 620 disposed on the sensing plate 610. A sensor configured to detect a magnetic force of the sensing magnet 620 may be disposed on the substrate 700. In this case, the sensor may be a Hall integrated circuit (IC) and serves to detect a magnetic flux of the sensing magnet of the sensing part 600 coupled to the rotating shaft 100. The sensing part 600 and the substrate 700 serve to detect a position of the rotor 200 by detecting the magnetic flux which is changed according to rotation.

FIG. 2 is a view illustrating the stator and the busbar.

Referring to FIG. 2, the busbar 400 is disposed on the stator 300. The busbar 400 may include the body 410 and the terminals 420. The terminals 420 are fixed to the body 410. The terminals 420 are fused and connected to the coils 330. The terminal 420 may be one of a phase terminal, a neutral terminal, and a power terminal.

FIG. 3 is a view illustrating the stator.

Referring to FIG. 3, the stator core 310 may include a first core 310A and a second core 310B. The first core 310A and the second core 310B may be integrally formed or individually formed as individual products. The first core 310A and the second core 310B may be defined as cores around which one coil 330 is wound. The insulators 320 may include a first insulator 320A and a second insulator 320B. The first insulator 320A may be installed on the first core 310A. The second insulator 320B may be installed on the second core 310B.

Winding of the coil 330 starts from the second insulator 320B and is completed at the first insulator 320A.

A starting end S and a finishing end T of the coil 330 may be cut to be arranged in an upright state so as to be fused to the terminals 420.

FIG. 4 is a view illustrating the first insulator, and FIG. 5 is a view illustrating a slot of the first insulator.

Referring to FIGS. 4 and 5, the first insulator 320A may include a body 321A, a guide 322A, and a holder 323A. The body 321A is a portion on which the coil 330 is wound. The guide 322A is disposed to extend upward from an outer side of the body 321A. The holder 323A extends from an upper side of the guide 322A.

The guide 322A includes an opening 324A. The opening 324A may include a side surface 1, a lower surface 2, and an upper surface 3. One side surface of the opening 324A may be open. The opening 324A guides the finishing end T of the coil 330 toward the holder 323A.

The holder 323A includes a groove 7. The holder 323A includes a side surface 4, an upper surface 5, and a lower surface 6. The groove 7 may be formed from the lower surface 6 of the holder 323A to the upper surface 5 thereof. A step is formed between the side surface 4 of the holder 323A and an upper surface 8 of the guide 322A. The holder 323A overlaps the opening 324A in a shaft direction. The groove 7 of the holder 323A is disposed above the opening 324A. An entrance direction of the groove 7 may be an outside of the first insulator 320A.

The upper surface 3 of the opening 324A corresponds to the lower surface 6 of the holder 323A. The lower surface 2 of the opening 324A includes an inclined surface. A direction in which the inclined surface is inclined may be a direction toward the body 321A.

The guide 322A may include a plurality of slots 325A. The slots 325A are disposed on an outer side surface of the guide 322A. The plurality of slots 325A may be disposed in a height direction of the guide 322A. For example, the number of the slots 325A may correspond to the number of the coils 330. For example, the number of the slots 325A may be three.

The opening 324A may be disposed in an uppermost slot 325A of the plurality of slots 325A.

The first insulator 320A may include an upper part P1 and a lower part P2. The holder 323A and the opening 324A may be disposed in the upper part P1.

FIG. 6 is a view illustrating the first insulator around which the coil is wound.

Referring to FIG. 6, the finishing end T of the coil 330 is inserted into the groove 7 of the holder 323A through the opening 324A. The holder 323A fixes the finishing end T. A position of the finishing end T positioned in the holder 323A is arranged in a state in which the finishing end T stands upright. Since the finishing end T of the coil 330 is a point at which winding is finished, the arrangement of the position thereof is difficult due to tension or loosening of the coil 330. The holder 323A fixes the finishing end T of the coil 330 to serve to easily arrange the position of the finishing end T. In this case, the position at which the finishing end T is arranged is a position at which the finishing end T is fused to the terminal 420.

FIG. 7 is a view illustrating the slot, in which the coil is disposed, of the first insulator.

Referring to FIG. 7, the coil 330 wound around the second insulator 320B (see FIG. 3) is guided to the slot 325A of the first insulator 320A and wound around the first insulator 320A.

FIG. 8 is a view illustrating the second insulator, and FIG. 9 is a view illustrating a groove of the second insulator.

Referring to FIGS. 8 and 9, the second insulator 320B may include a body 321B and a guide 322B. The body 321B is a portion around which the coil 330 is wound. The guide 322B is disposed to extend upward from the outer side of the body 321B. In the second insulator 320B, a holder 323A is omitted unlike the first insulator 320A. This is for securing a space through which a nozzle moves to the upper side of the guide 322B of the second insulator 320B for winding the coil 330.

A groove 9 is disposed inside the guide 322B. The groove 9 may be disposed from an inner side surface 10 to an upper surface 11 of the guide 322B.

The second insulator 320B may include an upper part P3 and a lower part P4. The groove 9 may be disposed in the upper part P3.

FIG. 10 is a view illustrating the second insulator around which the coil is wound.

Referring to FIG. 10, the starting end S of the coil 330 is positioned in the groove 9. While the coil 330 is wound, since the starting end S of the coil 330 is inserted into the groove 9, the starting end S is naturally arranged in an upright state.

FIG. 11 is a plan view illustrating the stator, and FIG. 12 is a view illustrating a first coil, a second coil, and a third coil.

Referring to FIGS. 11 and 12, the first insulator 320A may be provided as a plurality of first insulators 320A, and the second insulator 320B may be provided as a plurality of second insulators 320B. In the case of a twelve-slot motor, the motor may include six first insulators 320A and a six second insulators 320B. Among six first insulators 320A, three first insulators 320A may be disposed adjacent to each other. Accordingly, two first groups G1 each including three first insulators 320A may be provided and disposed to be spaced apart from each other in the circumferential direction.

Among six second insulators 320B, three second insulators 320B may be disposed adjacent to each other. Two second groups G2 each including three second insulators 320B are provided and disposed to be spaced apart from each other in the circumferential direction. In the circumferential direction, the second group G2 may be disposed between two first groups G1.

The coils 330 may include a first coil 330A, a second coil 330B, and a third coil 330C. The first coil 330A, the second coil 330B, and the third coil 330C are connected to different power sources.

The first insulators 320A is a first group G1 that may include a first-1 insulator 320Aa, a first-2 insulator 320Ab, and a first-3 insulator 320Ac which are disposed adjacent to each other. On the basis of the circumferential direction, the first-2 insulator 320Ab may be positioned at a center thereof. On the basis of the circumferential direction, the first-2 insulator 320Ab may be disposed at one side of the first-1 insulator 320Aa, and a second-3 insulator 320Bc may be disposed at the other side thereof.

The second insulators 320B is a second group G2 that may include a second-1 insulator 320Ba, a second-2 insulator 320Bb, and the second-3 insulator 320Bc. In the circumferential direction, the second-2 insulator 320Bb may be disposed at a center thereof. In the circumferential direction, the second-1 insulator 320Ba may be disposed at one side of the second-2 insulator 320Bb, and the second-3 insulator 320Bc may be disposed at the other side thereof.

The first-1 insulator 320Aa may be disposed adjacent to the second-3 insulator 320Bc.

The first coil 330A starts to be wound around the second-1 insulator 320Ba, moves to the first-1 insulator 320Aa, and is completely wound around the first-1 insulator 320Aa. In other words, the first coil 330A completely wound around the second-1 insulator 320Ba moves into the slot of the second-1 insulator 320Ba, passes through the slot of the second-2 insulator 320Bb and the slot of the second-3 insulator 320Bc, and is guided to the slot of the first-1 insulator 320Aa. The first coil 330A guided to the slot of the first-1 insulator 320Aa is wound around the first-1 insulator 320Aa, and after that, the finishing end T of the first coil 330 is fixed to the holder 323A of the first-1 insulator 320Aa so that the position of the finishing end T is arranged.

The second coil 330B and the third coil 330C are wound through the same methods as that of the first coil 330A.

On the first insulator 320A and the second insulator 320B around which one coil 330 is wound, the sum of the number of the coils 330 overlapping each other on an outer side surface of the first insulator 320A in the shaft direction and the number of the coils 330 overlapping each other on an outer side surface of the second insulator 320B in the shaft direction may be four. In FIG. 12, the number indicated by D is the sum of the numbers of the coils 330 overlapping each other in the shaft direction.

For example, since only the first coil 330A is positioned in the slot of the second-1 insulator 320Ba, D at the second-1 insulator 320Ba corresponds to ①. Since the first coil 330A and the second coil 330B are positioned in the slots of the second-2 insulator 320Bb, D at the second-2 insulator 320Bb corresponds to ②. Since the first coil 330A, the second coil 330B, and the third coil 330C are positioned in the slots of the second-3 insulator 320Bc, D at the second-3 insulator 320Bc corresponds to ③. Since the first coil 330A, the second coil 330B, and the third coil 330C are positioned on the first-1 insulator 320Aa adjacent to the second-3 insulator 320Bc, D at the first-1 insulator 320Aa corresponds to ③. Since the second coil 330B and the third coil 330C are positioned in the slots of the first-2 insulator 320Ab, D at the first-2 insulator 320Ab corresponds to ②. Since only the third coil 330C is positioned in the slot of the first-3 insulator 320Ac, D at the first-3 insulator 320Ac corresponds to ①.

In this case, as an example, the first coil 330A is positioned at an uppermost end among three slots of each of the first insulator 320A and the second insulator 320B, but the first coil 330A may be positioned at a lowermost end thereof. That is, even when the first coil 330A is disposed at the lowermost end among the slots, the second coil 330B is disposed at an intermediate end among the slots, and the third coil 330C is disposed at the uppermost end among the slots, D may correspond to ③ in the present embodiment. This may be changed according to a direction in which the coil is wound.

FIG. 13 is a view illustrating a stator of a motor according to a second embodiment.

Referring to FIG. 13, a stator core 1310 may include a first core 1310A and a second core 1310B. The first core 1310A and the second core 1310B may be integrally formed or individually formed as individual products. The first core 1310A and the second core 1310B may be defined as cores around which one coil 1330 is wound. Insulators 1320 may include a first insulator 1320A and a second insulator 1320B. In this case, a shape of the first insulator 1320A may be different from a shape of the second insulator 1320B. In addition, the first insulator 1320A is installed on the first core 1310A, and the second insulator 1320B is installed on the second core 1310B.

Winding of the coil 1330 starts from the second insulator 1320B and is completed at the first insulator 1320A.

A starting end S and a finishing end T of the coil 1330 may be cut to be arranged in an upright state so as to be fused to terminals of a busbar.

FIG. 14 is a view illustrating the first insulator when viewed from the inside, and FIG. 15 is a view illustrating the first insulator when viewed from the outside.

Referring to FIGS. 14 and 15, the first insulator 1320A may include a body 1321A, a guide 1322A, and a holder 1323A. The body 1321A is a portion which is disposed on a tooth of the stator core and around which the coil 1330 is wound. The guide 1322A is disposed to extend upward from an outer side of the body 1321A. The holder 1323A extends from an upper side of the guide 1322A.

The holder 1323A includes an opening 1324A. The holder 1323A may include a side surface 11, a lower surface 12, and an upper surface 13 forming the opening 1324A. One side surface of the opening 1324A may be open. The finishing end T of the coil 1330 is guided toward the holder 1323A through a portion of the opening 1324A which is one open side surface of the holder 1323A.

The holder 1323A includes a groove 17. The holder 1323A includes a side surface 14, an upper surface 15, and a lower surface 16. The groove 17 may be formed from the lower surface 16 to the upper surface 15 of the holder 1323A. A step is formed between the side surface 14 of the holder 1323A and an upper surface 8a of the guide 1322A.

The groove 17 and the opening 1324A overlap in a shaft direction. The groove 17 of the holder 1323A is disposed above the opening 1324A. An entrance direction of the groove 17 may be an inner side of the holder 1323A.

The lower surface 16 of the holder 1323A may be the same as the upper surface 13, in which the opening 1324A is formed, of the holder 1323A. The lower surface 12 of the opening 1324A may be obliquely disposed. A direction in which the lower surface 12 is inclined may be a direction to face downward toward an outer side of the guide 1322A. The lower surface 12 of the opening 1324A is connected to an outer side surface 322Aa of the guide 1322A. The first insulator 1320A may include an upper part P11 and a lower part P12. The holder 1323A and the opening 1324A may be disposed in the upper part P11.

FIG. 16 is a plan view illustrating the holder of the first insulator.

Referring to FIG. 16, an entrance of the groove 17 of the holder 1323A is disposed in an inner surface of the holder 1323A. The side surface 14 has a curved shape which continues from an inner surface 19 to an outer surface 110. The side surface 14 has an advantage of smoothly guiding the coil 1330 which is wound outward from the inner side of the holder 1323A along the side surface 14 like w1 of FIG. 16. In addition, the side surface 14 prevents the coil 1330 from being damaged at the side surface 14 and an edge of the inner surface 19 or the side surface 14 and an edge of the outer surface 110.

The side surface 14 may be divided into a first surface 14a and a second surface 14b. The first surface 14a and the second surface 14b may be disposed to be stepped. This is for avoiding a groove 1311 disposed in an outer circumferential surface of the stator core 1310. Both of the first surface 14a and the second surface 14b may have a convexly curved shape.

The holder 1323A has a shape in which a thickness T1 in a circumferential direction is much greater than a thickness T2 in a radial direction. This is for securing stiffness of the holder 1323A against tension of the coil 1330 when an end portion of the coil 1330 is wound around the outer surface 110 through the inner surface 19 and the side surface 14 of the holder 1323A.

FIG. 17 is a side view illustrating the first insulator.

Referring to FIGS. 16 and 17, an inner boundary of 18c between an inner surface 18b and an upper surface 18a of the guide 1322A may have a convexly curved surface. Accordingly, there is an advantage of easily guiding the coil 1330 wound around the outer surface 110 from the inner surface 19 through the side surface 14 of the holder 1323A like w2 of FIG. 6. In addition, there is an advantage of preventing the coil 1330 from being damaged at an inner edge of the inner surface 18b and an inner edge of the upper surface 18a of the guide 1322A.

FIG. 18 is a view illustrating the first insulator around which the coil is wound when viewed from the inside, and FIG. 19 is a view illustrating the first insulator around which the coil is wound when viewed from the outside.

Referring to FIGS. 18 and 19, the finishing end T of the coil 1330 is wound along the outer surface 110 of the holder 1323A or the outer side surface 322Aa of the guide 1322A from the inner side of the holder 1323A through the side surface 14. The finishing end T of the coil 1330 wound in the above-described manner is inserted into the groove 17 of the holder 1323A through the opening 1324A. The holder 1323A fixes the finishing end T. A position of the finishing end T positioned in the holder 1323A is arranged in a state in which the finishing end T stands upright. Since the finishing end T of the coil 1330 is a point at which the winding finishes, arrangement of the position of the finishing end T is difficult due to tension or loosening of the coil 1330. The holder 1323A serves to easily arrange the position of the finishing end T by fixing the finishing end T of the coil 1330. In this case, the position at which the finishing end T is arranged is a position at which a busbar 1400 is fused to the terminal.

FIG. 20 is a view illustrating the second insulator, and FIG. 21 is a view illustrating a groove of the second insulator.

Referring to FIGS. 20 and 21, the second insulator 1320B may include a body 1321B and a guide 1322B. The body 1321B is a portion around which the coil 1330 is disposed and wound. The guide 1322B is disposed to extend upward from an outer side of the body 1321B. In the second insulator 1320B, a holder 1323A is omitted unlike the first insulator 1320A. This is for securing a space through which a nozzle moves to an upper side of the guide 1322B of the second insulator 1320B for winding the coil 1330.

A groove 11 is disposed inside the guide 1322B. The groove 11 may be formed from an inner side surface 13 to an upper surface 12 of the guide 1322B.

The second insulator 1320B may include an upper part P13 and a lower part P14. The groove 11 may be disposed in the upper part P13.

FIG. 22 is a view illustrating the second insulator around which the coil is wound.

Referring to FIG. 22, the starting end S of the coil 1330 is positioned in the groove 11. While the coil 1330 is wound, since the starting end S of the coil 1330 is inserted into the groove 11, a position of the starting end S is naturally arranged in a state in which the starting end S stands upright.

The invention claimed is:

1. A motor comprising:
a housing;
a stator disposed in the housing;
a rotor disposed inside the stator; and
a shaft coupled to the rotor,
wherein the stator includes a stator core, a first insulator disposed on the stator core, and a coil disposed on the first insulator,
wherein the first insulator includes a body on which the coil is disposed, a guide extending from one side of the body and including an opening, and a holder extending from one portion of the guide and including a groove, and
wherein the opening includes a bottom surface which has an inclination with respect to an axial direction and the holder axially overlaps the bottom surface.

2. The motor of claim 1, wherein an upper surface of the opening corresponds to a lower surface of the holder.

3. The motor of claim 1, wherein a lower surface of the holder is inclined toward the body with respect to the axial direction.

4. The motor of claim 1, wherein the opening includes a side surface parallel to the axial direction.

5. The motor of claim 1, wherein the bottom surface and a side surface of the opening contact the coil to support the coil.

6. The motor of claim 1, wherein an entrance direction of the groove is radially outside of the first insulator.

7. The motor of claim 1, wherein the guide is positioned between the holder and the body in the axial direction.

8. The motor of claim 1, wherein the groove of the holder is formed from a lower surface to an upper surface of the holder.

9. A motor comprising:
a housing;
a stator disposed in the housing;
a rotor disposed inside the stator; and
a shaft coupled to the rotor,
wherein the stator includes a stator core, a first insulator disposed on the stator core, and a coil disposed on the first insulator,
wherein the first insulator includes a body on which the coil is disposed, a guide extending from one side of the body, and a holder extending from one portion of the guide and including an opening and a groove,
wherein the holder includes a side surface and an upper surface, wherein a step is formed between the side surface and an upper surface of the guide,
wherein one portion of the coil is in contact with the side surface and is disposed in an opening of the guide and the groove of the holder, and the groove of the holder is disposed above the opening and an entrance direction of the groove is an outside of the first insulator,
wherein the holder includes an inner surface and an outer surface, and
wherein the side surface includes a curved surface which continues from the inner surface to the outer surface.

10. A motor comprising:
a housing;
a stator disposed in the housing;
a rotor disposed inside the stator; and
a shaft coupled to the rotor,
wherein the stator includes a stator core, a first insulator and a second insulator which are coupled to the stator core, and a coil disposed on the first insulator and the second insulator,
wherein a starting end of the coil is disposed on the second insulator,
wherein a finishing end of the coil is disposed on the first insulator,
wherein the first insulator includes a body, a guide extending from one side of the body, and a holder extending from the guide and including an opening and a groove,
wherein the holder includes a side surface and an upper surface, wherein a step is formed between the side surface and an upper surface of the guide,
wherein one portion of the coil is in contact with the side surface and passes through an opening of the guide,
wherein the finishing end is disposed in the groove of the holder, and the groove of the holder is disposed above the opening and an entrance direction of the groove is an outside of the first insulator,
wherein the holder includes an inner surface and an outer surface, and
wherein the side surface includes a curved surface which continues from the inner surface to the outer surface.

* * * * *